United States Patent [19]
Kirk et al.

[11] Patent Number: 5,303,332
[45] Date of Patent: Apr. 12, 1994

[54] LANGUAGE FOR ECONOMICALLY BUILDING COMPLEX, LARGE-SCALE, EFFICIENT, RULE-BASED SYSTEMS AND SUB-SYSTEMS

[75] Inventors: Steven A. Kirk, Chelmsford; William S. Yerazunis, Marlboro; William Barabash, Acton; Ken A. Gilbert, Harvard, all of Mass.

[73] Assignee: Digital Equipment Corporation, Maynard, Mass.

[21] Appl. No.: 559,342

[22] Filed: Jul. 30, 1990

[51] Int. Cl.$^5$ .......................................... G06F 15/40
[52] U.S. Cl. .................................................... 395/60
[58] Field of Search ............................ 395/60, 53, 11

[56] References Cited

U.S. PATENT DOCUMENTS

| | | | |
|---|---|---|---|
| 4,648,044 | 3/1987 | Hardy et al. | 364/513 |
| 4,658,370 | 4/1987 | Erman et al. | 364/513 |
| 4,809,219 | 2/1989 | Ashford et al. | 395/54 |
| 4,949,278 | 8/1990 | Davies et al. | 364/513 |
| 5,101,362 | 3/1992 | Simoudis | 395/53 |

FOREIGN PATENT DOCUMENTS

| | | | |
|---|---|---|---|
| 0245925 | 11/1987 | European Pat. Off. | G06F 9/44 |
| 01-261729 | 10/1989 | Japan | G06F 9/44 |

OTHER PUBLICATIONS

Nii, "Blackboard Systems Blackboard Application Systems, Blackboard Systems from a Knowledge Engineering Perspective", AI Magazine, Aug. 1986, pp. 82-106.

Nii, "Blackboard Systems: The Blackboard Model of Problem Solving and the Evolution of Blackboard Architectures," AI Magazine, Summer 1986.

Walters, "Crafting Knowledge-Based Systems Expert Systems made Realistic," Wiley & Sons, 1988, p. 205.

Bocionek, Fischer, "Task-oriented Programming with Co-Operating Rule-Based Modules"; Engineering Applications of Artificial Intelligence, vol. 2, Sep. 1989, pp. 207-213.

Quemeneur et al, "Corada: Un Generateur De Modules Experts"; Proceedings of the 2nd International Workshop on Software Engineering and Its Applications, Dec. 8, 1989, Nanterre, France, pp. 817-826.

Surko, "Modularizing OPS-Based Expert Systems Under Unit"; IEEE Proceedings of the 10th Anniversary COMSAC 86, Oct. 10, 1986, Chicago, Ill., USA, pp. 58-64.

Kriz, Sugaya, "Logic Programming"; Proceedings of a Brown Boveri Symposium: Computer Systems for Process Control, Sep. 3, 1985, Baden, Switzerland, pp. 305-341.

Harmon, et al., "Expert Systems Tools and Applications," Chapters 7-9 (Mid-Size Rule-Based Tools, Large Rule-Based Tools, Hybrid Tools), published by John Wiley & Sons, Inc., ISBN 0-471-983950-7, 1988.

Harmon, "Currently Available Expert Systems-Building Tools," Expert Systems Strategies, vol. 4, No. 7, 1988, pp. 3-15.

"Mainframe Tools: the Battle for Market Share," Artificial Intelligence Research, New Science Associates, Jul. 3, 1989, pp. 1103-1118.

Forgy, "On the Efficient Implementation of Production Systems," Carnegie-Mellon University, Department of Computer Science, 1979.

Forgy, "OPS5 User's Manual," Carnegie-Mellon University, Department of Computer Science, 1981.

(List continued on next page.)

*Primary Examiner*—Michael R. Fleming
*Assistant Examiner*—Robert W. Downs
*Attorney, Agent, or Firm*—Albert P. Cefalo; Dirk Brinkman

[57] ABSTRACT

A compiled, rule-based expert system for a data base. The system incorporates compiled declarations to incorporate the concept of strong typing at compile time. Both data and rules can be declared so as to be accessible from one or more modules, as required. Such a scheme reduces program complexity, reduces program development time, and increases the ease with which rule-based programs may be embedded in procedural programs.

2 Claims, 15 Drawing Sheets

OTHER PUBLICATIONS

Forgy, "Rete: A Fast Algorithm for the Many Pattern/Many Object Pattern Match Problem," Artificial Intelligence, vol. 19, 1982.

Orciuch et al., "The Application of Modular Software Engineering Techniques to a Very Large Expert System," Proceedings of the 19th Hawaii International Conference on System Sciences, Hawaii, 1986.

Wegner, "Dimensions of Object–Based Language Design," OOPSLA '87 Proceedings, 1987.

D. L. Parnas et al., "The Modular Structure of Complex Systems," IEEE, Ref. #0270-5257/84/0000/0408, pp. 408–417, 1984.

E. Soloway et al., "Assessing the Maintainability of XCON-in-RIME: Coping with the Problems of a VERY Large Rule-Base," IEEE Expert Systems, pp. 824–829, 1987.

WORKING MEMORY

| CLASS | ^COLOR | ^STATE | |
|---|---|---|---|
| PANTS | BLUE | DIRTY | ~210 |
| PANTS | BLACK | CLEAN | ~220 |
| PANTS | BLUE | CLEAN | ~240 |

| CLASS | ^COLOR | ^STATE | |
|---|---|---|---|
| SOCKS | BLUE | CLEAN | ~270 |
| SOCKS | BLACK | CLEAN | ~260 |

| CLASS | ^NAME | ^COMPLIMENTS | |
|---|---|---|---|
| COLOR | BLACK | BLACK | ~280 |
| COLOR | BLUE | BLUE | ~290 |
| COLOR | WHITE | WHITE | ~295 |
| COLOR | GREY | GREY | ~297 |
| COLOR | BLACK | WHITE | ~281 |
| COLOR | WHITE | BLACK | ~296 |

| CLASS | ^NAME | ^STATE | ^AGE | |
|---|---|---|---|---|
| SHIRT | BLUE | CLEAN | ONE YEAR | ~230 |
| SHIRT | WHITE | CLEAN | TEN YEARS | ~250 |

FIG. 2

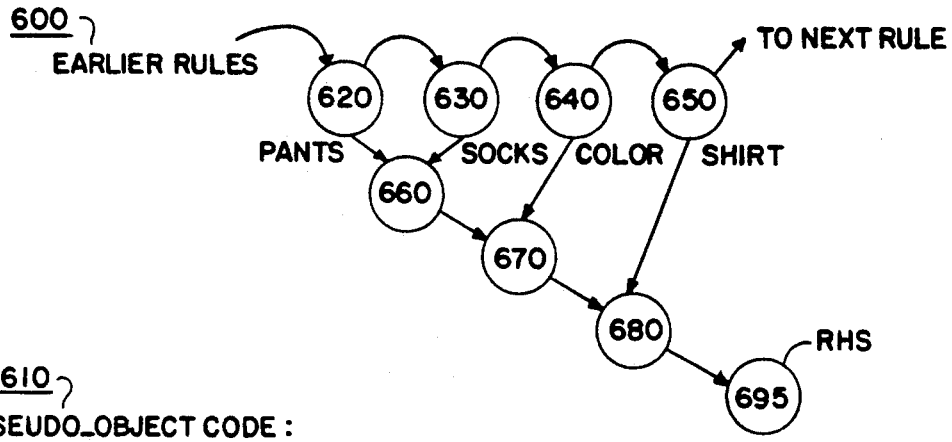

NETWORK FOR RULE, "FIND_MATCHED_SET":

```
PSEUDO_OBJECT CODE:

RULE_TESTS(A_WM) {
    CALL PANTS_CLASS_COLOR_TEST (A_WM):
    CALL SOCKS_CLASS_COLOR_TEST (A_WM):    } TESTS CORRESPONDING
    CALL COLOR_CLASS_COLOR_TEST (A_WM):    } TO RULE,
    CALL SHIRT_CLASS_COLOR_TEST (A_WM):    } "FIND_MATCHED_SET"
}

PANTS_CLASS_TEST (A_WM) {
    IF (CLASS_OF (A_WM) = "PANTS") THEN {
        IF (A_WM PASSES ALL OTHER LOCAL TESTS) THEN {    { ≡ 620
            ADD A_WM TO THE TABLE OF PANTS WME;
            CALL PANTS_SOCKS_JOIN_TEST (A_WM);
        }
    }
}                                                       { ≡ 660

PANTS_SOCKS_JOIN_TEST (A_WM) {
    FOREACH SOCK_WM IN TABLE OF SOCKS WMES {
        IF (A_WM AND SOCK_WM PASS ALL INTER_OBJECT TESTS) THEN {
            ADD (A_WM,SOCK_WM) TO TABLE OF PANTS/SOCKS PAIRS;
            CALL PANTS_SOCKS_COLOR_JOIN_TEST (A_WM,SOCK_WM);
        }
    }
}

SOCKS_PANTS_JOIN_TEST(A_WM) {
    FOREACH PANTS_WM IN TABLE OF PANTS WMES {
        IF (A_WM AND PANTS_WM PASS ALL INTER_OBJECT TESTS) THEN {
            ADD (PANTS_WM,A_WM) TO TABLE OF PANTS/SOCKS PAIRS;
            CALL PANTS_SOCKS_COLOR_JOIN_TEST (PANTS_WM,A_WM);
        }
    }
}
```

FIG. 6

NETWORK FOR RULE, "FIND_MATCHED_SET", DURING EXECUTION:
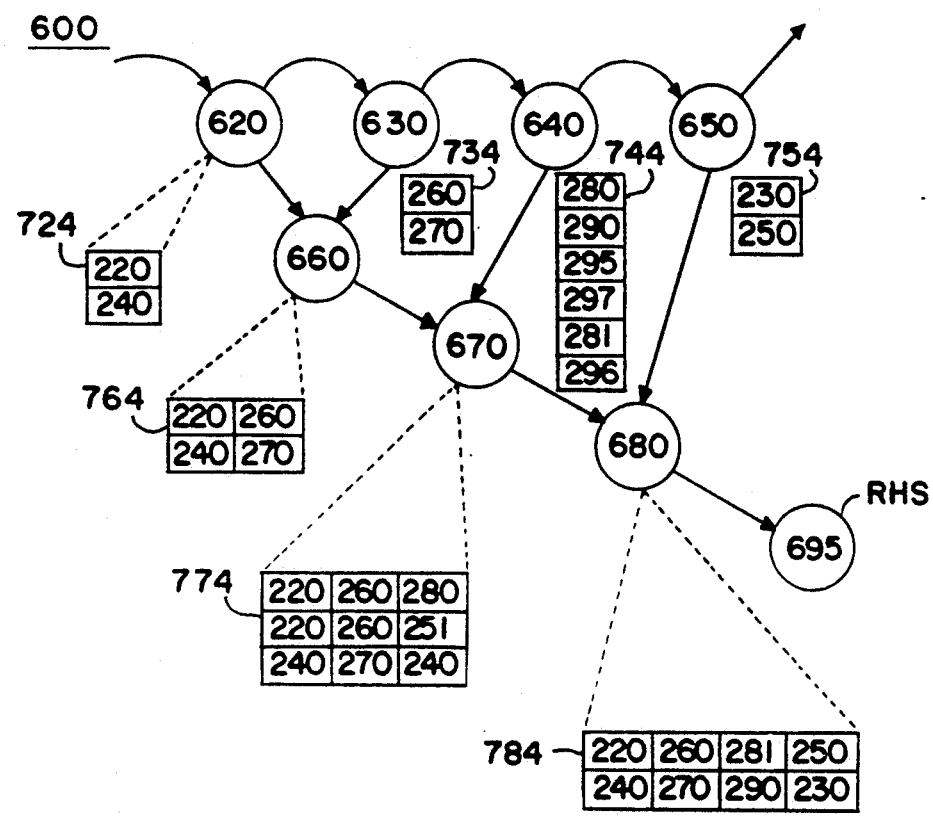
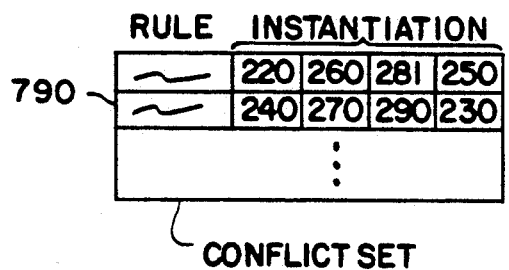
FIG. 7

LANGUAGE FOR ECONOMICALLY BUILDING COMPLEX, LARGE-SCALE, EFFICIENT, RULE-BASED SYSTEMS AND SUB-SYSTEMS

BACKGROUND OF THE INVENTION

This application relates to artificial intelligence and expert systems and, more particularly, to rule-based expert systems.

An expert system is a data processing system that attempts to duplicate a decision process used by a human expert when performing a complex task. Expert systems have been designed, for example, to design circuit board layouts, to configure computer systems, to perform scheduling on a factory floor, and so on.

In the fields of configuration and scheduling, there are usually recognized human "experts". These experts often have two sets of information based on experience that enable them to effectively and efficiently perform a task. First, the experts usually possess a set of "rules of thumb" about how the task should be performed. Second, the experts understand under what circumstances each rule of thumb should be applied. Expert systems often encode the "rules of thumb" knowledge of a human expert as a series of "rules" having a format as follows:

IF conditions THEN actions.

The "conditions" portion of a rule specifies one or more conditions or tests. If all tests in the conditions portion of a rule are true, then the actions portion of the rule can be performed, as described below. For example, a rule in a system that schedules jobs in a factory may include a rule such as:

IF
   there is a MACHINE with a STATUS of BROKEN and
   a STATUS of UNSCHEDULED requiring that machine
THEN
   set the STATUS of the JOB to NOT-SCHEDULABLE.

In this example, if a machine is broken, then the system will not schedule jobs that require the broken machine, and a status of "NOT-SCHEDULABLE" will be recorded for the job. Other rules in the system will indicate what is to be done when a job is not-schedulable.

The conditions portion of a rule is also called the "Left Hand Side" of the rule (abbreviated "LHS") or the predicate portion. The actions portion of a rule is also called the "Right Hand Side" of the rule (abbreviated "RHS"). Execution of the actions portion of a rule is also called "firing the rule".

To emulate an expert's application of these types of knowledge, conventional expert systems include a mechanism to determine, based on the information available, the appropriate sequence of rule activation. This mechanism is commonly referred to as the "inference engine".

Rule-based expert systems have been effective in solving problems which require large amounts of expertise. When compared to the problem being automated, expert systems are much more similar in structure and flow of control to human intuition than are programs created using standard "procedural" languages, such as Pascal or FORTRAN. As a result, the expert systems have been easier to conceive, develop, and maintain than functionally identical systems developed using standard programming languages.

In addition, expert systems have enabled automation of problems previously considered intractable. Programs (for example, Digital Equipment Corporation's XCON, a program for configuring computer systems) have been successfully implemented using expert systems techniques when efforts using standard techniques had failed.

The success of expert systems can be traced to two concepts that differentiate rule-based programming from standard programming. These two concepts are: global memory and non-procedural execution, as described below.

Conventional rule-based programming uses a global memory, usually referred to a "working memory". Working memory contains all the information available to the rules for testing conditions. All rules can test any information in working memory. Conversely, once information has been put into working memory, it is visible to all rules. This working memory differs from that of standard programming languages, where there is a distinct mapping (scope) defining which data is visible to which executable statements.

Moreover, in rule-based programming, rules are the only type of executable statement. Unlike standard languages where the sequence of execution is based on the sequence of executable statements in a program, sequence of rule executions is based on decisions made by the inference engine concerning eligibility of a rule to fire. This process of determining eligibility and executing a rule is called the recognize-act cycle. In the recognize step, a rule is selected based on information in working memory and according to the strategy incorporated in the inference engine. In the act step, the RHS of the selected rule is executed. These two steps are repeated until there are no rules eligible to be executed, or until a rule indicating a Halt action is executed. The recognize-act cycle is described below in more detail.

The concepts of global memory and non-procedural execution make it possible for conventional rule-based systems to closely emulate the actions of a human expert. Working memory contains all the information available to the expert. For example, in the shop floor scheduling example above, the working memory contains information identifying the machines available for scheduling and the jobs needing to be scheduled. Thus, rule-based, non-procedural execution is a much closer analog to the decision process of a human expert, where decisions about what should be done next are highly situation dependent.

There are at least two problems that limit the effectiveness and range of conventional rule-based programming. These are: complexity and embedability, as discussed below.

Because all information in a conventional rule-based system is global, program complexity, as measured by the number of potential interactions between separate parts of the program, tends to grow exponentially as program size grows linearly. There are numerous problems for which rule-based programming is appropriate that are small in size and, therefore, do not have problems with complexity. There are also problems of significant size that can be solved with rule-based programming, but are difficult to develop and maintain because of the resulting complexity.

The problem of complexity is not unique to rule-based programming. Standard, procedural, programming languages solve the problem of complexity through modularization. To reduce complexity, large programs are modularized, i.e., partitioned into modules. Each module is smaller, and less complex than the total system, with a well-defined interface to the other modules. A module can be built or modified without having to understand the entire program and can be more easily re-used or shared when appropriate. This reduction in size, combined with a better specification of module inter-dependence, reduces complexity.

The software engineering concept of modularity has traditionally been considered to be in direct conflict with the principles underlying rule-based programming. Although some rule-based languages have incorporated modularity concepts, these languages have retained few of the original benefits of a rule-based language. These languages eliminate the concept of global memory, and do not allow sharing of data between modules.

As mentioned above, another problem of conventional rule-based programming is a lack of embedability, i.e., integration of rule-based systems with programs written in standard, procedural languages. Rule-based programming is not suitable for all tasks. There are numerous tasks that are procedural in nature, for which procedural programming is more appropriate than rule-based programming In most large systems, there is a portion of the solution that is best addressed by procedural programming, and a portion best addressed by non-procedural programming. Existing rule-based programming languages are difficult and, in some cases impossible, to integrate with procedural languages because rule-based languages usually lack callable entry points that the procedural program can use to call the rule-based program.

Conventional rule-based programming lacks appropriate mechanisms to manage the complexity of rule-based systems and for embedding these expert systems in procedural systems, as needed.

SUMMARY OF THE INVENTION

The present invention overcomes the problems and disadvantages of the prior art by defining a compiled rule-based programming language that incorporates the concepts of data modularity and rule modularity. Thus, both rules and data can be partitioned to allow appropriate sharing of data and rules between expert systems and their components. The concept of rule modularity allows a rule based system to be called from a procedural language, such as Pascal or FORTRAN, and allows a rule-based expert system to be embedded in a larger program written in a procedural language. Thus, by allowing a programmer to define both modules that do not share information and modules that do share information, the present invention addresses the needs of those expert systems where global access is critical, as well as expert systems where a high degree of modularity is required to limit complexity.

In accordance with the purpose of the invention, as embodied and broadly described herein, the invention is a method and apparatus for modularizing a set of data elements stored in a memory of a rule-based data processing system, wherein each of the data elements has one of a plurality of structures, wherein each of a plurality of rules used by the expert system is stored in the memory of the system, the method performed by the data processing system and comprising the steps of: storing in the memory a plurality of declarations for a plurality of disjoint rule groups, wherein each declaration of a rule group defines which of the plurality of rules belong to said rule group; storing in the memory a plurality of data declarations, each data declaration defining one of the plurality of structures of the data elements; and associating, in the memory of the data processing system, each rule group with one or more data declarations, wherein a first rule group is associated with at least one data declaration in common with a second rule group and wherein said first rule group is associated with at least one data declaration not associated with said second rule group.

In further accordance with the purpose of the invention, as embodied and broadly described herein, the invention is a method and apparatus for modularizing a plurality of rules used by a rule-based expert data processing system and stored in a memory of the data processing system, the method performed by the data processing system and comprising the steps of: storing in the memory a plurality of entry block declarations, each entry block declaration defining one of a plurality of entry blocks, each of which is a callable entry point in the system; grouping the rules in the memory into a plurality of rule groups, wherein each rule group includes at least one rule; and associating, in the memory of the data processing system, each entry block with one or more rule groups, wherein a first entry block is associated with at least one rule group in common with a second entry block and wherein the first entry block is associated with at least one rule group not associated with the second entry block.

Advantages of the invention will be set forth in part in the description which follows and in part will be obvious from the description or may be learned by practice of the invention. The advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 2 shows the contents of a working memory, similar to a working memory of FIG. 1;

FIG. 6 shows a tree data structure and pseudo object code illustrating how the rule of FIG. 5 is compiled into executable code;

FIG. 7 shows tables, containing data of FIG. 2, generated by execution of the object code of FIG. 6;

DETAILED DESCRIPTION OF THE PREFERRED EMBODIMENTS

Reference will now be made in detail to the preferred embodiments of the invention, examples of which are illustrated in the accompanying drawings Wherever possible, the same reference numbers will be used throughout the drawings to refer to the same or like parts.

I. BACKGROUND

A. Hardware

The present invention is preferably embodied in software programs residing on a VAX data processing system operating under the VMS or Ultrix operating system, all of which are manufactured by Digital Equipment Corporation. In a preferred embodiment, the software programs of the expert system are written in a language similar to the Rule-based language OPS5, but including additional programming language constructs to implement data modularity and rule modularity. The OPS5 programming language is described in Forgy, "OPS5 User's Manual", Department of Computer Science, Carnegie-Mellon University, Pittsburgh, Pa., 1981, which is herein explicitly incorporated by reference. The programming language of a preferred embodiment is compiled by a compiler developed by Digital Equipment Corporation. The present invention, however, is not limited to this specific programming language, compiler, data processing system, or operating system. Nor is the present invention in any way limited to products or systems manufactured by Digital Equipment Corporation, nor to the specific syntax of the language described with regard to the preferred embodiment.

Figure 1:
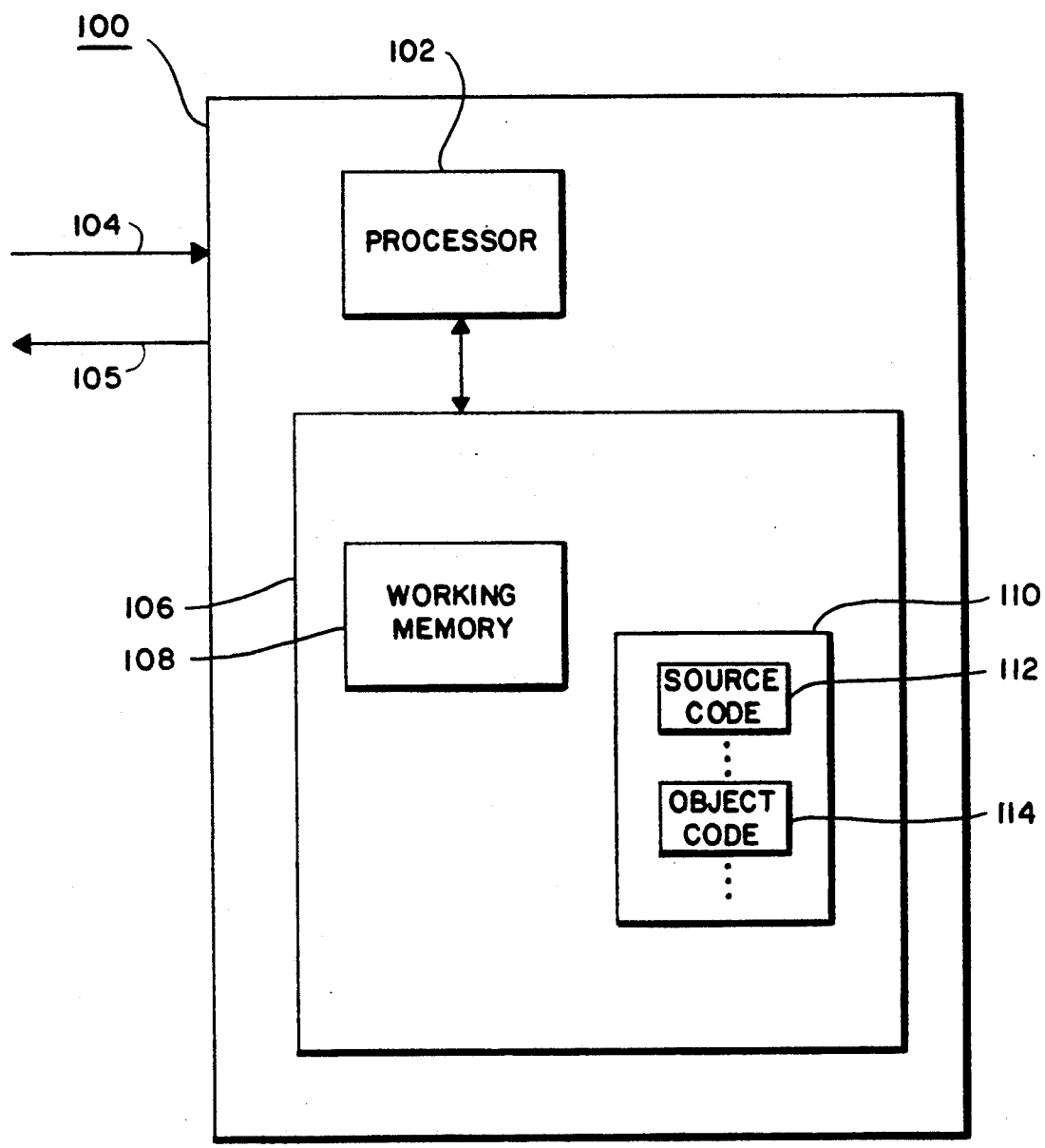
FIG. 1 is a block diagram showing a data processing system for compiling and executing programs written in a rule-based programming language.

FIG. 1 is a block diagram showing a data processing system 100 for executing programs written in a rule-based programming language. FIG. 1 includes a processor 102, an input line 104, an output line 105, and a memory 106. Memory 106 includes a working memory 108 and a memory 110. Working memory 108 includes information (not shown) to be tested and acted on by the rules of the system. Memory 110 includes rules in source code modules (also called compilable modules) 112 and in object code modules (also called executable modules) 114, as described in more detail below. Processor 102 is coupled to and can access memory 106. It will be understood that rules-based systems can be implemented on a wide range of hardware, and the elements of FIG. 1 are shown for purposes of example only and not as a limitation.

B. Data Representation

The present invention operates in conjunction with a data base (also called a working memory) stored in a memory internal to a data processing system, as shown in FIG. 2. FIG. 2 shows a working memory 200, similar to working memory 108 of FIG. 1. Working memory 200 includes a plurality of "working memory elements" (abbreviated as WME's, pronounced "whimmys") 202. Each of the WME's typically belongs to one of a plurality of "WME classes". A WME class defines the structure and organization of all WME's belonging to that class.

The structure of several of the WME's shown in FIG. 2 are described in detail below. Additional WME's are shown but not described The structures of these undescribed WME's, however, are similar to those of the described WME'S.

WME 210, which belongs to a WME class of "Pants", has two attributes. The first attribute is a Color attribute 214 and the second attribute is a State attribute 216. The number and type of attributes are the same for all WME's of a given WME class. However, the attribute values for WME's of a given WME class may differ Thus, all WME's of WME class Pants include a Color attribute 214 and a State attribute 216 (although only attributes for WME 210 are labeled for the sake of clarity). However, WME 210 has an attribute value of "Blue" for Color attribute 214, while WME 220 has an attribute value of "Black" for Color attribute 214. Similarly, in FIG. 2, WME 230 in working memory 200 belongs to WME class "Shirt" and has a Color attribute 234 having an associated value of "Blue", a State attribute 236 having an associated value of "Clean", and an Age attribute 238 having an associated value of "one year".

WME's are placed into working memory 200 in several ways. First, WME's can be created by execution of a RHS of a rule, as described in more detail below. Second, WME's can be entered into working memory 200 from an external data base, or in accordance with data entered by a human being from a keyboard. Other ways of creating WME's in working memory 200 may be used without departing from the spirit and scope of the present invention.

It should be understood that any method may be used for defining the number and attribute structures of WME's entered into working memory 200 and for defining the values of each WME attribute. The present invention is not directed toward the initial creation of data elements in working memory 200, and thus the scope of the invention is not affected by the method used to create data elements in working memory 200. Therefore, it should be understood that the specific organization and values for the working memory 200 of FIG. 2 are for the sake of example only, and do not limit the scope of the present invention. Any suitable data base and data base organizational structure could be used to implement the present invention in a manner dictated by the specific type of problem to be solved by the expert system.

Execution of a RHS of a rule can effect WME's in various ways. Execution of a RHS of a rule can cause a WME to be deleted. For example, WME 210 could be removed from working memory 200 by execution of a RHS of a rule. Similarly, execution of a RHS of a rule can cause a WME to be added to working memory 200. For example, WME 210 could have been created and given the attribute values shown in FIG. 2 by execution of a RHS of a rule. In addition, execution of a RHS of a rule can change the attribute value of an existing WME. For example, execution of a RHS of a rule could have changed the value of Color attribute 214 of WME 210 from some initial value to its present value of "BLUE".

It should be understood that WME's exist in working memory 200 during execution of the compiled rules of the expert system. WME's need not exist during the process of rule compilation.

Figure 3:
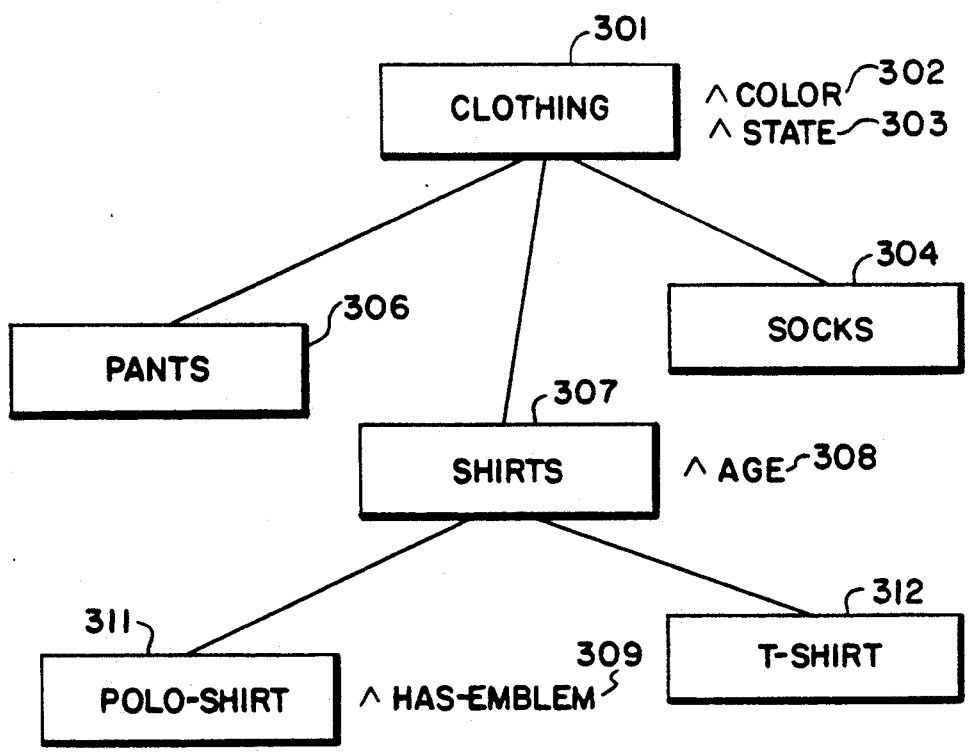
FIG. 3 shows an inheritance tree for some of the contents of the working memory of FIG. 2.

In a preferred embodiment of the present invention, some WME's may "inherit" parts of their WME class from a "Parent" WME class. FIG. 3 shows an inheritance tree 300 that includes the WME classes Pants, Shirt, and Socks of FIG. 2. In FIG. 3, a parent WME class of "Clothing" has two associated attributes, "^ Color" and "^ State". Each of WME classes Pants, Shirt, and Socks "inherits" the attributes of the parent class Clothing by a WME-class declaration in the source code having a form similar to the following definition for WME class Pants:

WME-CLASS PANTS INHERIT CLOTHES.

In addition, the WME class Shirt has an additional attribute of "^ Age" as described above. This WME class having an additional attribute is declared in a form similar to the following:

WME-CLASS SHIRT INHERIT CLOTHES
^ AGE number-of-years, where "^ AGE" is an attribute name and "number-of-years" is a predetermined attribute type. Thus, each of the sub-classes of WME class shirt in FIG. 3 ("Polo-Shirt" and "T-shirt") has the attributes Color, State, and Age. In addition, the WME class Polo-Shirt shown in the example of FIG. 3 has an additional attribute of "^ Has Emblem" indicating whether the polo shirt represented by a WME of class Polo-Shirt has an emblem on the pocket. Inheritance of attributes is known to persons of ordinary skill in art and will not be described in detail herein.

C. Syntax and Compilation

As stated above, a preferred embodiment of the present invention uses an extension of the OPS5 programming language and the associated compilation and execution techniques needed to use the language. This language preferably contains the following types of statements: "WME class declarations", (WME's are described in the previous section) "external function declarations", "entry block declarations", "rule group declarations", "rules", and "catchers". Of these statement types, external function declarations, rules and catchers exist in conventional rule-based languages, such as OPS5, and will not be described in detail herein. Because the only type of executable statements in the language used in the implementation of the invention is the "rule", such a programming language may seem strange to persons unfamiliar with compiled rule-based systems. The following discussion is intended to serve as an introduction to the general techniques used in generating object code from source code written in a rule-based programming language, such as OPS5. It is not intended as an exhaustive treatment of this topic, as the general principles of compiling and executing rule-based systems are well-known to persons of ordinary skill in the art. The specifics of the present invention will be discussed at a later point.

i) Compilation

Figure 4:
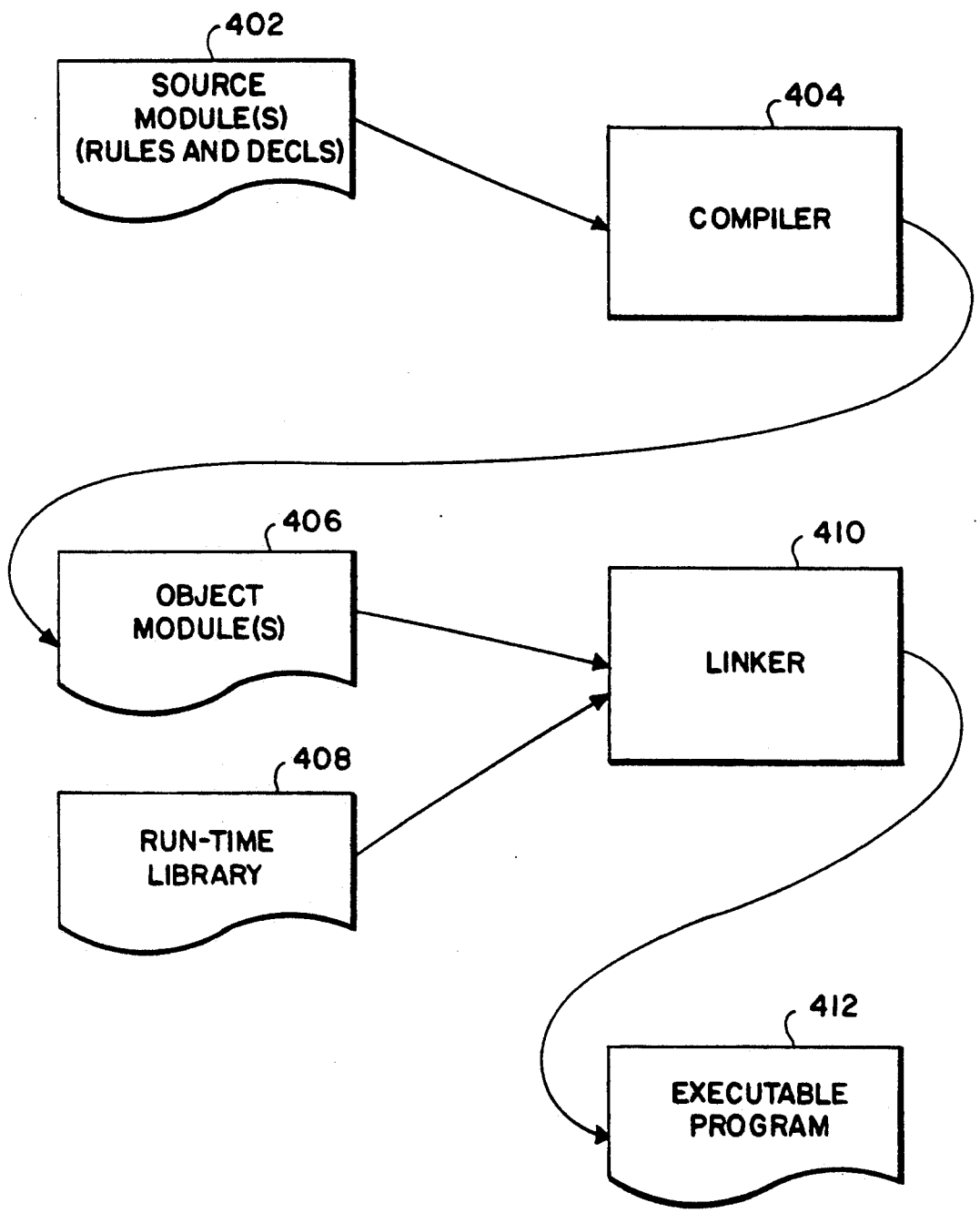
FIG. 4 is a block diagram of a compilation process wherein one or more source modules of a rule-based programming language are converted into executable code.

Some expert system programming languages, such as OPS5, are "compiled languages". As shown in FIG. 4, one or more modules of "source code" 402 are subjected to a process called "compilation", which is performed by a software program called a compiler 404, to yield corresponding modules of "object code" 406. Throughout this application, the word "module" refers to a compilable unit, such as a file. Source code modules 402 are in a human-readable form resembling English. Object code modules 406 are in a form similar to the machine language instructions performed by a data processing system. Once the source code modules 402 are compiled, the resulting object code modules 406 along with additional object code modules from a run-time library 408 are linked together by a computer program called a "linker" 410 which produces "executable code" 412 consisting of machine language instructions in a form that can be executed by a processor similar to processor 102 of FIG. 1.

It should be understood that rules in source code format are required to exist in memory 110 only during the compilation process. Once source code rules are compiled into object code, it is not necessary to retain the source code in memory during execution of the expert system.

ii) Rule Syntax and Meaning in Source Code

Figure 5:
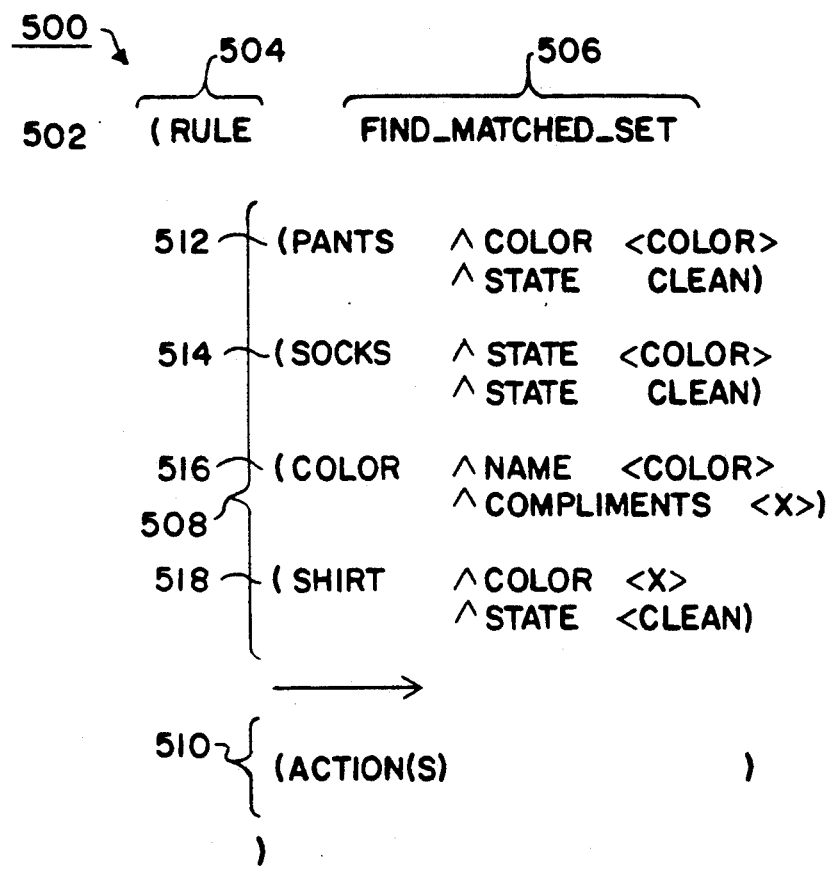
FIG. 5 shows the syntax of a rule in a rule-based programming language.

FIG. 5 shows an example of a pseudo rule 500 written in source code of some rule-based programming language. The syntax of this pseudo rule does not correspond exactly to the syntax for rules used in, for example, the OPS5 language, but is included here to explain the concept of a rule and to give an idea of rule syntax in a typical rule-based expert system used in conjunction with working memory 200 previously described in connection with FIG. 2.

In FIG. 5, rule 500 consists of a first line 502 containing the word "RULE" 504 followed by the name of the rule ("find-matched-set") 506. After first line 502 are a LHS 508 and a RHS 510 (not shown in detail). LHS 508 includes a plurality of tests 512, 514, 516, and 518.

Test 512 includes two conditions. The first condition includes the word "PANTS", representing a WME class of pants, the word "^ COLOR", representing a Color attribute of WME class Pants, and the word "<color>", representing a variable that will take on a value of the Color attribute. In rule 500, each term contained in brackets ("<" and ">") represents such a variable, and such a reference serves either to bind the variable to a value or to compare the bound value to some other value. Thus, a first use of the variable <color> binds a value to the variable and subsequent uses of the variable <color> access the bound value. Each time rule 500 is tested, the attribute value matched for the first condition of test 512 will be "bound" to the variable <color> for the remainder of the test. Thus, the first condition of test 512 is met if a Pants WME having a color attribute exists in working memory 200. The second condition of test 512 includes the word "^ STATE" and the word "CLEAN". Thus, the second condition of test 512 is met if a Pants WME having a State attribute with a value of "Clean" exists in working memory 200. Test 512 is true only if both conditions are true, i.e., if a Pants WME having both a Color attribute with any value and a State attribute with a value of "Clean" exists in working memory 200. WME 240 of FIG. 2 is an example of such a WME.

Test 514 includes two conditions. The first condition includes the word "SOCKS", representing a WME class of Socks, the word " ^ COLOR", representing a Color attribute of WME class Socks, and the word "<color>", representing the value of the Color attribute matched during test 512. Thus, the first condition of test 514 is met if a Socks WME having a same Color attribute value as the Pants WME matched in test 512 exists. The second condition of test 514 includes the word " ^ STATE" and the word "CLEAN". Thus, the second condition of test 514 is met if a Socks WME having a State attribute with a value of "Clean" exists in working memory 200. Test 514 is true only if both conditions are true, i.e., if a Socks WME with the same Color attribute value as the Pants WME of test 512 and a State attribute value of "Clean" exists.

Test 516 includes two conditions. The first condition includes the word "COLOR", representing a WME class of Color, the word " ^ NAME", representing a Name attribute of WME class Color, and the word "<color>", representing the value of the Color attribute matched in tests 512 and 514. Thus, the first condition of test 516 is met if a Color WME having the attribute value previously bound to the variable <color> exists. The second condition of test 516 includes the word " ^ COMPLEMENT" and the word "<X>". Thus, the second condition of test 516 is met if a WME indicating that <color> complements some other color exists in working memory. This complementary Color value is bound to the variable <x>. Test 516 is true only if both conditions are true, i.e., if a Color WME having a same Color attribute value as the Pants and Shirt WME's and any value for the attribute Complements exists.

Test 518 includes two conditions. The first condition includes the word "SHIRT", representing a WME class of Shirt, the word " ^ COLOR", representing a Color attribute of WME class Shirt, and the word "<x>", representing the complementary value of <color> from test 516. Thus, the first condition of test 518 is met if a Shirt WME having a Color attribute value complementing the pants and socks exits. The second condition of test 518 includes the word " ^ STATE" and the word "CLEAN". Thus, the second condition of test 518 is met if a Shirt WME having a State attribute value of clean exists in working memory 200. Test 518 is true if a Shirt WME having a Color attribute value that complements <color> and a State attribute value of "Clean" exists in working memory 200.

If each of the tests 512, 514, 516, and 518 is true, than LHS 508 of rule 500 is true, and the expert system may "decide" to execute RHS 510 of rule 500 for one of the pants/socks/shirt/color combinations for which rule 500 is true, as discussed below.

It is important to note that more than one pants/socks/shirt/ color combination may exist for which the LHS of rule 500 is true. For example, FIG. 2 shows three WME's of class Pants, two WME's of class Shirt, two WME's of class Socks, and six WME's of class Color Among these WME's, one combination for which the LHS of rule 500 is true is: clean blue pants 240, clean blue socks 270, color blue complements blue 290, and clean blue shirt 230. Another combination for which the RHS of rule 200 is true is: clean black pants 220, clean black socks 260, color white complements color black 296 and clean white shirt 250.

iii) Rule Compilation

FIG. 6 shows a tree structure 600 and pseudo object code 610 illustrating how rule 500 of FIG. 5 is compiled into executable code by compiler 404 of FIG. 4. A person of ordinary skill in the art will understand that this pseudo object code is presented in FIG. 6 for purposes of clarity, and that compiler 404 actually translates rule 500 into executable machine instructions, which are not easily readable by humans. Pseudo object code 610 of FIG. 6 is presented in a human-readable form for ease of example.

The compilation of rules into object code is well known to persons of ordinary skill in the art. One such compilation technique, called the "Rete" algorithm, is described in Forgy, "Rete: A Fast Algorithm for the Many Pattern/Many Object Pattern Match Problem", Artificial Intelligence 19, pp. 17–37, which is explicitly incorporated herein by reference. A preferred implementation of the invention uses the Rete algorithm, but other algorithms for translating rules into object code, such as the Treat algorithm, could also be used without departing from the scope of the invention.

In FIG. 6, each test 512, 514, 516 and 518 of rule 500 is compiled into object code that forms a node of tree 600. Thus, test 512 is compiled into object code at node 620 that "decides" whether a WME satisfies the "local tests" of test 512. In other words, all tests comparing WME attribute values and constant values for WME's of class Pants are tested by node 620. For example, at node 620, if a WME belongs to class Pants, then the value of the State attribute of the WME is checked to see if it contains a value of "Clean", as specified in test 512. On the other hand, testing and binding of the <color> variable takes place at a lower level of tree 600 as described below. This object code generated by compiler 404 for node 620 is shown in FIG. 6 as pseudo object code 625. Similarly, test 514 is compiled into object code at node 630 that decides whether a WME satisfies test 514. Test 516 is compiled into object code at node 640 that decides whether a WME satisfies test 516. Test 518 is compiled into object code at node 650 that decides whether a WME satisfies test 518. Only the pseudo object code for node 620 is shown in FIG. 6, but it should be understood that each node of tree 600 has associated pseudo object code generated by compiler 404 that implements the "local" tests of the corresponding condition of a rule. Thus, compiler 404 generates object code for each condition of the LHS of rule 500.

In addition to object code for nodes 620, 630, 640, and 650, compiler 404 generates object code for a node 660 that looks at the WME's identified by nodes 620 and 630 and decides whether any WME's satisfy both tests 512 and 514. Thus, node 660 performs, for example, the test to determine whether the value bound to variable <color> in test 512 matches the Color attribute value of WME's satisfying the local tests of node 630. Pairs of pseudo code 662 and 664 are associated with node 660. As shown in pseudo code 625 for node 620, whenever a WME satisfying test 512 is found, node 620 calls "PANTS-SOCKS-JOIN-TEST pseudo code 662. Pseudo code 662 determines if a current Pants WME matches any of the so-far identified Socks WME's. Similarly, pseudo code 664 is called by node 630 (pseudo code not shown) to determine whether a current Socks WME matches any of the so-far identified Pants WME's Similar pairs of pseudo code are generated by compiler 404 for nodes 670 and 680.

Thus, any combination of WME's (such as the Pants/socks/color/shirt examples given above) that satisfies the test compiled as object code node 680 satisfies the entire LHS of rule 500. As described above, there may be more than one combination of WME's that satisfies rule 500.

FIG. 6 shows additional pseudo object code 615 generated by compiler 404 that executes the object code associated with each of the tests of rules 500 (and other rules in the system). Thus, object code 615 executes object code associated with each of nodes 620, 630, 640, and 650. The result of such execution is described below.

FIG. 6 shows that tree 600 points to an additional object code node 695. Node 695 is generated by compiler 404 to implement the RHS of rule 500. Node 695 and its generation will not be described in detail, as this type of code generation is well-known to persons of ordinary skill in the art.

D. Execution

Now that the process of compiling rules into object code as performed by conventional rule-based systems is understood, the general process of executing the executable code resulting from the compiled rules in conventional rule-based systems will be discussed. It should be understood that compiler 404 generates additional object code to execute the steps described below, as described in connection with FIG. 6 above.

FIG. 7 shows tables 724, 734, 744, 754, 764, 774, and 784 generated by execution of respective nodes 620, 630, 640, 650, 660, 670, and 680 of tree 600, invoked by steps 802 and 808 of FIG. 8, as discussed below. These tables are stored in memory 106 of data processing system 100 or some similar memory. As shown in FIG. 7, table 724 contains all WME's satisfying the local tests of test 512. Thus, each of the Pants WME's having a Color attribute and a State attribute of "Clean" has an entry in table 724. Table 734 contains all WME's satisfying local tests of test 514. Thus, each of the Socks WME's having a Color attribute and a State attribute of "Clean" has an entry in table 734. Table 744 contains all WME's satisfying local tests of test 516. Thus, each of the Color WME's having a Value attribute and a Complements attribute has an entry in table 744. Table 754 contains all WME's satisfying local tests of test 518. Thus, each of the Shirt WME's having a Color attribute and a State attribute of "Clean" has an entry in table 724.

Object code node 660 generates table 764 from tables 724 and 734. Pairs of WME's from tables 724 and 734 that have a common Color attribute value are placed as entries in table 764. Specifically, WME 240 and WME 270 each have color attribute values of "Blue" and are thus placed as an entry in table 764. Similarly, WME 220 and WME 260 each have Color attribute values of "Black" and are thus placed as an entry in table 764.

Object code node 670 generates table 774 from tables 764 and 744. The WME's from table 764 and the WME's from table 744 that have a complementary Color attribute value are placed as entries in table 774. Specifically, WME 240 and WME 270 each have color attribute values of "Blue" and WME 290 has a complementary color for blue. Thus, these three WME's are placed as an entry in table 774. Similarly, WME 220 and WME 260 each have Color attribute values of "Black" and WME's 280 and 281 give complementary colors for black. Thus, two additional three-WME entries are placed in table 774.

Object code node 680 generates table 784 from tables 774 and 754. Because table 784 will contain entries identifying each combination of WME's that satisfies rule 500, table 784 is called a "decision table" for rule 500. In the example, table 784 is generated as follows: The WME's from table 774 and the WME's from table 754 that have a common complementary Color attribute value are placed as entries in table 784. Specifically, WME 240 and WME 270 which each have color attribute values of "Blue", WME 290 which gives complementary colors for blue, and WME 230 which has a Color attribute value (Blue) that complements blue are placed as an entry in table 734. Similarly, WME 220 and WME 260 which each have Color attribute values of "Black", WME 296 which gives complementary colors for Black and WME 250, which has a Color attribute value (white) that complements black are placed as an entry in table 784.

Thus, after node 650 has called 680, and control is returned from node 650, table 784 contains all the WME combinations that satisfy the LHS of Rule 500. Similar tree structures and tables are generated by compiler 404 for each rule that is compiled.

The set of all WME combinations for all rules is called a "conflict set". FIG. 7 shows a conflict set 790, which is used to decide which rule, of those rules whose LHS is satisfied, will be chosen to fire and which WME combination will be chosen for the fired rule to act upon. Node 680 includes object code to transfer the contents to table 784 to conflict set 790. Each WME combination that satisfies a rule forms an entry in conflict set 790. The chosen rule is fired by executing node 695 if, for example, rule 500 is chosen, for the chosen rule and WME combination. Each entry in conflict table 790 is called an "instantiation" of a rule.

Figure 8:
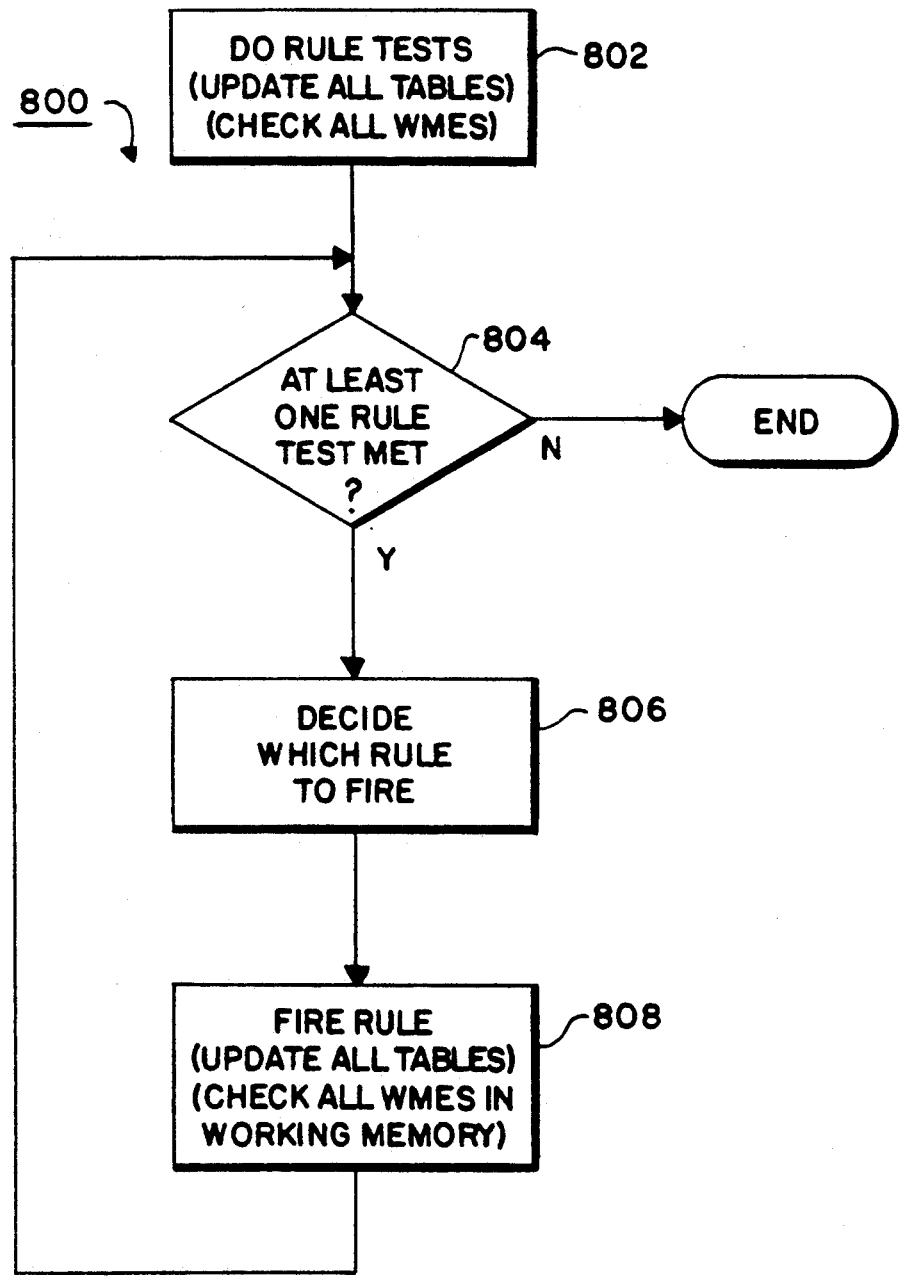
FIG. 8 is a flow chart of steps executed by a processor of FIG. 1 to execute a rule-based programming language.

FIG. 8 is a flow chart 800 of steps executed by processor 102 that is executing object code generated by compiler 404. In step 802, the processor calls object code 615 of FIG. 6, which tests all existing WME's in working memory against each rule in the system and updates tables 724, 734, 744, 754, 764, 774, 784, and the other tables associated with rules accordingly.

In step 804, the conflict set, which contains the contents of table 784 and other similar tables for the other rules, is checked, and the processor determines whether at least one rule has a combination of WME's that satisfies the LHS of that rule. If an empty conflict set exists, no more rules can be "fired" and processing is halted. Otherwise, control passes to step 806. In step 806, the processor decides which of the plurality of rules determined to be eligible to fire in step 802 should be fired using a predetermined decision process not described in detail herein. This decision process is not the subject of the present invention, and any number of methods could be used without departing from the scope of the present invention.

In step 808, the processor fires the rule decided upon in step 806 by calling object code, such as node 695. This step may result in WME's being added to working memory, WME's being deleted from working memory, changing one or more attribute values of WME's already in working memory, etc. Thus, the tables generated in connection with step 802 may not any longer be completely accurate, and the tables associated with each rule must be updated before control is passed back to step 804.

II. DATA MODULARITY AND RULE MODULARITY

The previous sections have described the operation of conventional rule-based systems. As described above, conventional rule-based systems either have had global data or have had modular data that cannot be shared between modules. The following discussion deals with "data modularity" as included in the present invention. Data modularity involves limiting knowledge of the existence of certain sets of WME's to a subset of all the rules in a program. In a preferred embodiment, the sets of WME's are defined by the WME class to which they belong, and the use of these WME sets is restricted to rules within the scope of declarations of the WME classes at compile time. Rule modularity involves limiting knowledge of the existence of rules to "entry blocks" associated with those rules at both compile time and execution time.

Figure 9:
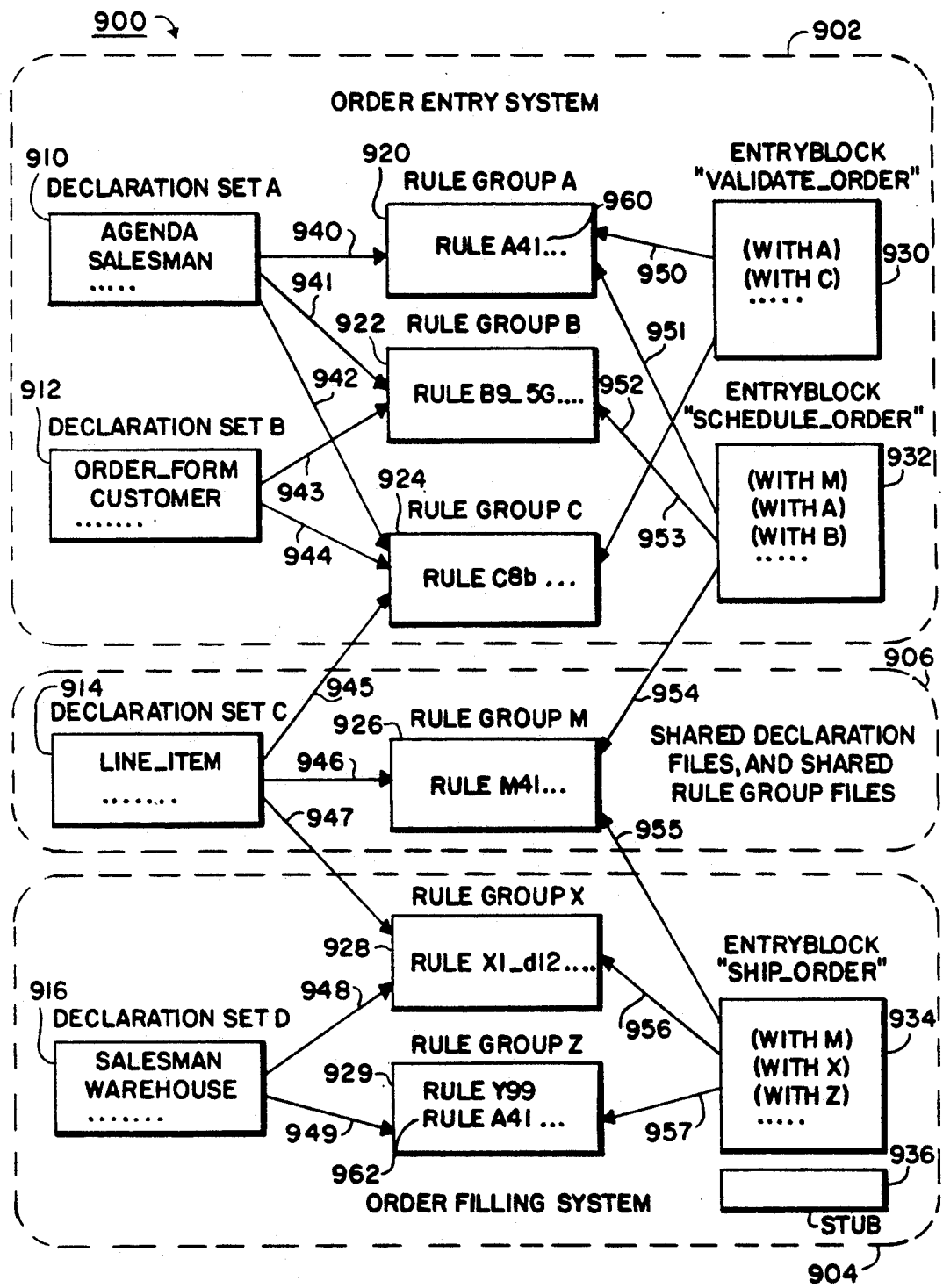
FIG. 9 is a block diagram showing an example of both the data modularity and rule modularity aspects of the present invention.

FIG. 9 is a block diagram 900 showing an example of both the data modularity and rule modularity aspects of the present invention. Block diagram 900 shows a plurality of declaration sets A 910, B 912, C 914, and D 916. Each declaration set includes declarations of one or more WME classes. FIG. 9 also includes a plurality of rule groups A 920, B 922, C 924, M 926, X 928, and Z 929. FIG. 9 further includes a plurality of entry blocks VALIDATE-ORDER 930, SCHEDULE-ORDER 932, SHIP-ORDER 934, and STUB 936.

FIG. 9 shows two subsystems: an order entry subsystem 902 and an order filling subsystem 904. Each of these subsystems has a number of components private to themselves, and both subsystems share a number of components, shown here as components 906.

For example, order entry subsystem 902 has declaration set A 910, declaration set B 912, Rule group A 920, Rule group B 922, Rule group C 924, entry block VALIDATE-ORDER 930, and entry block SCHEDULE-ORDER 932 as components that can only be accessed via entry block 930 or entry block 932. For this reason, these components are called "private" components.

Within declaration set A 910 are declared a plurality of WME classes, such as AGENDA, SALESMAN, etc. (Only two WME classes are shown for clarity). Likewise, rule group A 920 contains a plurality of rules, such as rule A41. (Again, only one rule is shown for clarity).

Similarly, order filling subsystem 904 has declaration set D 916, rule group X 928, rule group Z 929, entry block SHIP-ORDER 934, and entry block STUB 936 as private components. The two subsystems 902 and 904 also share declaration set C 914 and rule group M 926. The following discussion describes advantages of data modularity, and then describes advantages of rule modularity.

A. Data Modularity

The present invention includes modular data. Thus, while, at compile time, declarations can be shared between one or more entry blocks, data (for example, WME classes) can also be partitioned so as to be known to only one module, i.e., only to the rules in that module. Allowing both sharing and partitioning results in a much more flexible system, as described below.

Figure 10:
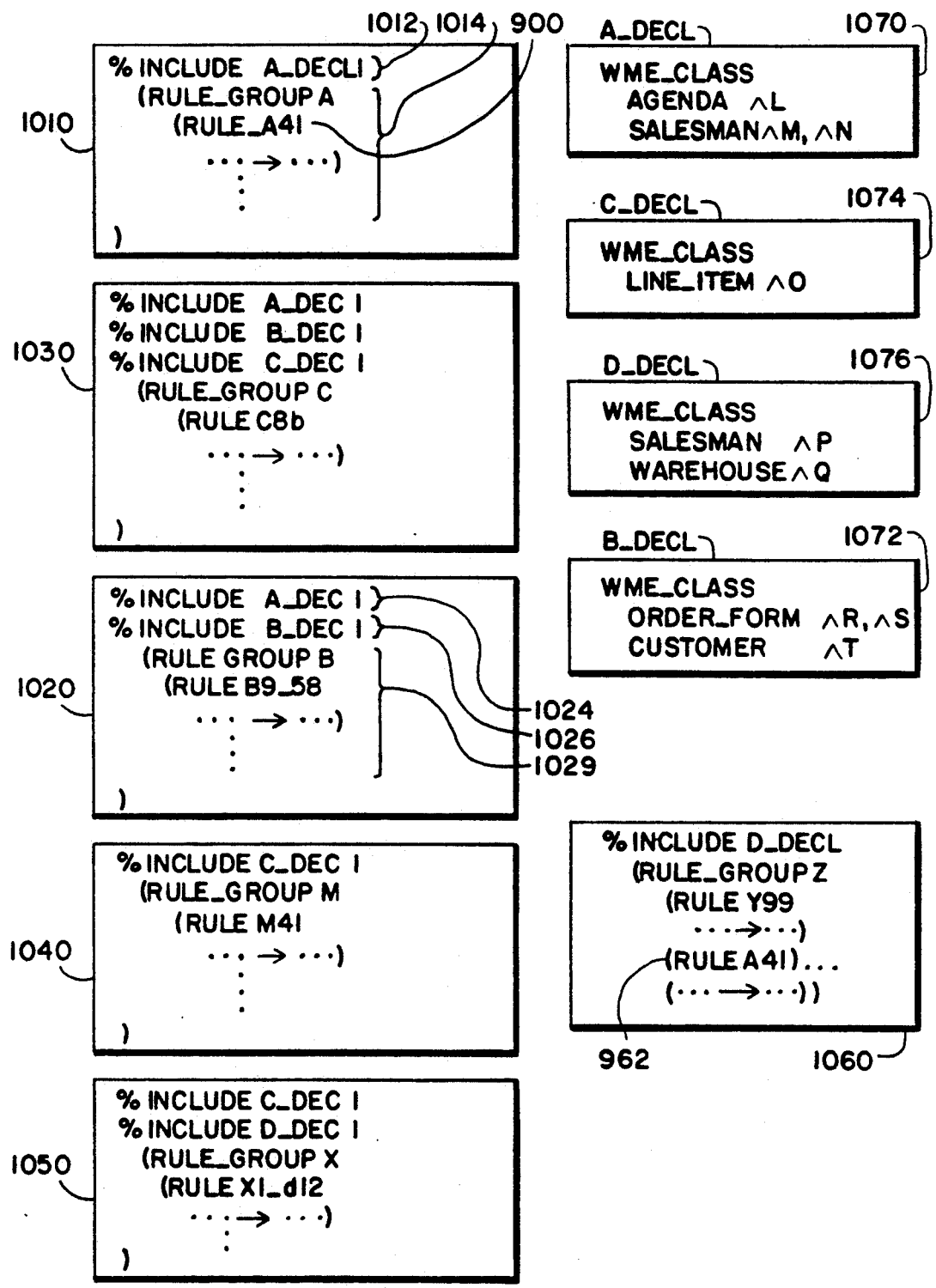
FIG. 10 shows an example of source code used with a preferred embodiment of the present invention.

FIG. 10 shows an example of source code used with a preferred embodiment of the present invention, and corresponding to block diagram 900 of FIG. 9. FIG. 10 shows six source code modules 1010, 1020, 1030, 1040, 1050, and 1060, each of which are compiled separately by compiler 404, and four "include files" 1070, 1072, 1074, and 1076. Include files are well known to persons of ordinary skill in the art. In brief, their contents can be included in any other source file by an "%INCLUDE" statement in the source file. Thus, "%INCLUDE" statement 1012 incorporates the statement "(WME CLASS AGENDA ^L, SALESMAN ^M, ^N)" from include file 1070 into source module 1010. Similarly, "%INCLUDE" statement 1024 incorporates the statement "(WME CLASS AGENDA ^ L, SALESMAN ^ M, ^ N)" from include file 1070 into source module 1020. Thus, the WME class declarations of declaration set A are incorporated into source modules 1010, 1020, and 1030 from Include file 1070. The WME class declaration could also be incorporated into the source modules directly. However, use of include files tends to ensure better uniformity of declarations.

In FIG. 10, module 1010 indirectly includes declarations of declaration set A at line 1012. Lines 1014 define the rules of rule group A 920. Module 1020 includes declarations of declaration sets A and B at lines 1024 and 1026, respectively. Lines 1029 define the rules of rule group B 922. Module 1030 defining rule group C 924, module 1040 defining rule group M 926, module 1050 defining rule group X 928, and module 1060 defining rule group Z 929 are similar and will not be described in detail herein.

Thus, arrows 940-949 of FIG. 9 can be thought of as meaning "this declaration set is known only to these rules". In other words, a rule cannot be compiled if it uses a WME class that is not known to that rule.

In a preferred embodiment of the invention, data modularity is checked at compile time. That is, compiler 404 checks to make sure that no rule references a WME class that is not declared in the same module as the rule.

This sharing of, for example, declaration set C 914 assures that the internal representation of WME classes declared in declaration set C 914 would be uniform and compatible across all subsystems knowing of declaration set C 914. For example, in FIG. 9, the representation of WME class LINE-ITEM, declared in declaration set C 914, is compatible between the order entry subsystem 902 and the order filling subsystem 904, and WME's of class LINE-ITEM can be manipulated easily by both subsystems 902 and 904.

In FIG. 9, both declaration set A 910 and declaration set D 916 contain a declaration for a WME class SALESMAN. Note, however, that no rule groups in either subsystem know of both SALESMAN declarations. Thus, a SALESMAN WME created by rule A41 of rule group A 920 would have attributes of ^ M and ^ N, as shown in FIG. 10, while a SALESMAN WME created by rule Y99 of rule group Z 929 would have an attributes of ^ P. This similarity of names will not cause difficulties, however, as each WME class SALESMAN is private to either subsystem 902 or subsystem 904. The two non-conflicting SALESMAN WME classes are an example of data partitioning.

Figure 11:
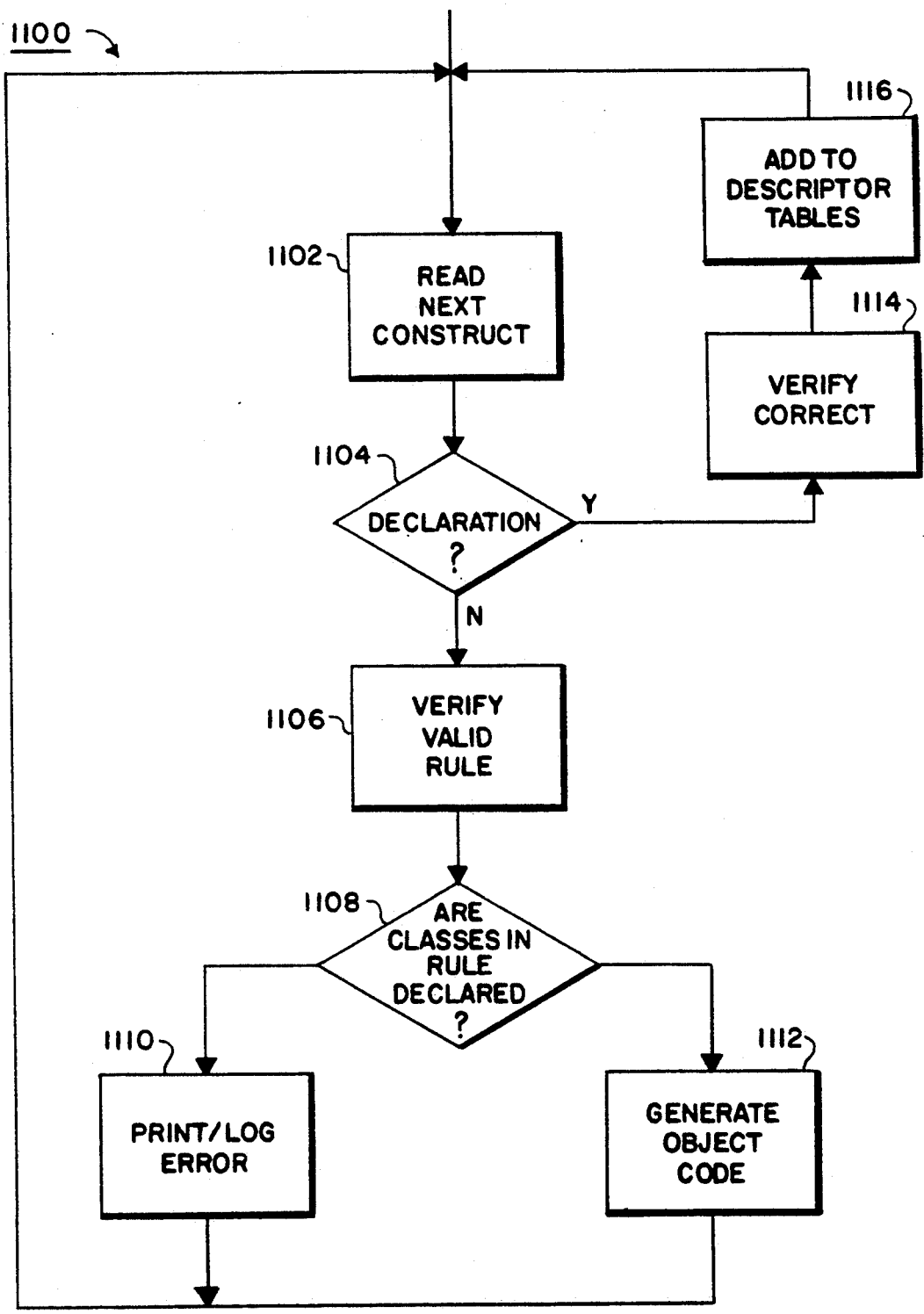
FIG. 11 is a flow chart of steps executed by a processor of FIG. 1 to compile a rule-based programming language.

FIG. 11 is a flow chart 1100 of the process of checking data modularity for one source module at compile time. The steps of flow chart 1100 are performed by a processor of a data processing system executing compiler 404. Similar steps are performed for each source module to be compiled. In step 1102 a next construct, i.e., programming language statement, is fetched from the source module. In step 1104, the processor determines whether the fetched construct is a WME class declaration. If not, in step 1106, the processor determines whether the fetched construct is a valid rule, i.e., whether the fetched construct has correct syntax. If so, in step 1108, the processor determines whether WME classes used in the rule are also declared in the module being compiled. If not, in step 1110, a compilation error is logged. Some embodiments may halt after step 1110. Other embodiments may simply log the error and continue. Such a decision is a design decision and does not affect the scope of the present invention. If, in step 1108, the rule references only declared WME classes, control returns to step 1102.

If, in step 1104, the fetched construct is a WME class declaration, the processor verifies the syntax of the declaration in step 1114. In step 1116, a reference to the declared WME class is saved in memory 106 for the current module. This saved reference preferably is used by step 1108 described above. In a preferred embodiment, compiler 404 also signals an error if an attempt is made to create a WME class with the same name as a WME class already known to the module. Thus, two SALESMAN WME classes can exist in FIGS. 9 and 10 because the two classes are not shared by the same module, and thus are not known by the same rules. Such partitioning allows for easier program development because developers of separate subsystems can reuse names of WME classes, so long as those WME classes are private.

In a preferred embodiment of the invention that includes inherited WME classes, as shown in FIG. 3, WME classes can only be inherited from parent classes that are known in the module containing the inherited declaration. Thus, in FIG. 11, if a WME class is declared as an inherited class, the verification performed in step 1114 would include a step to determine whether a parent class was known the module being compiled.

B. Rule Modularity i) Rule Modularity at Compile Time

The present invention also includes Rule modularity. Thus, while rules can be shared between one or more entry blocks, rules can also be partitioned so as to be known to only one entry block. Allowing both sharing and partitioning results in a much more flexible system, as described below.

FIG. 9 includes entry blocks 932, 934, and 936, each of which is associated with one or more rule groups 920, 922, 924, 926, 928, and 929 by arrows 950–957. Arrows 950–957 can be thought of as representing "at run time, this entry block includes this rule group". Note that entry block STUB 936 is not associated with any rule group. The reason for this will be discussed below.

Figure 12:
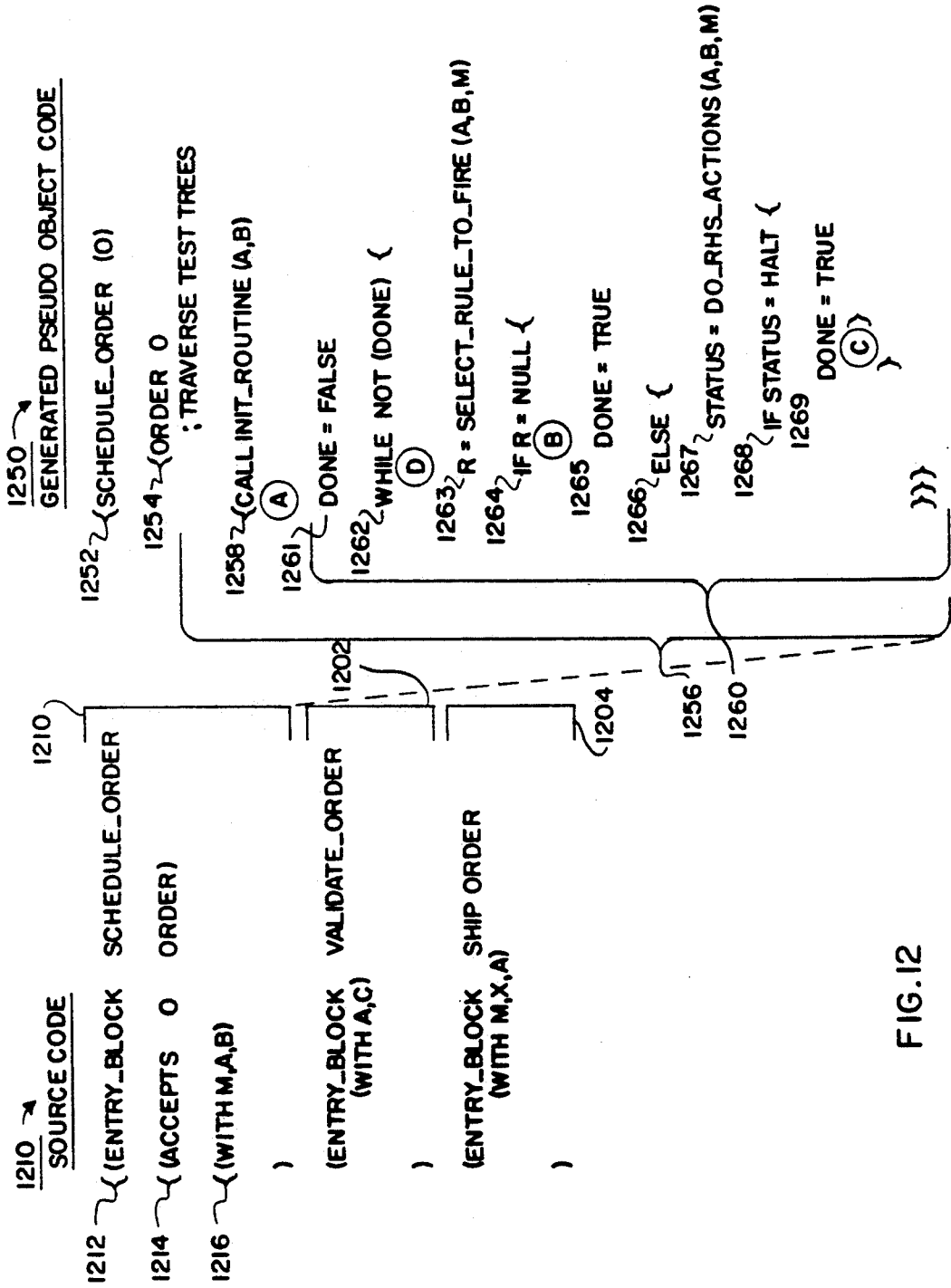
FIG. 12 shows a source code module and a pseudo object code module, which is generated by compilation of the source code module.

FIG. 12 shows a source code module 1210 and a pseudo object code module 1250, which is generated by compiler 404 from source code module 1210 in a preferred embodiment of the invention, and which corresponds to block diagram 900 of FIG. 9. Source code module 1210 includes an entry block declaration for entry blocks VALIDATE-ORDER 1202, SCHEDULE-ORDER 1210, and SHIP-ORDER 1204. Only the entry block declaration for entry block SCHEDULE-ORDER 1210 will be described in detail. Entry block declarations 1202 and 1204 are similar. Entry block 1210 includes a first line 1212, a second line 1214, and a third line 1216. First line 1212 contains the name of the entry block. Second line 1214 contains the string:

(ACCEPTS O ORDER)

and describes the values that can be passed to the entry block from an external program or other entry block Second line 1214 is optional.

Third line 1216 includes the string:

(WITH A, B, M)

and indicates that entry block SCHEDULE-ORDER 932 includes the rules in Rule groups A, B, and M. Third line 1216 is also optional. If line 1216 is omitted, the entry block will not be associated with a rule group, as is, for example entry block 936 of FIG. 9, but any of the optional statements described below may still appear in a declaration of entry block 936, and object code may be generated for entry block 936.

Figure 13:
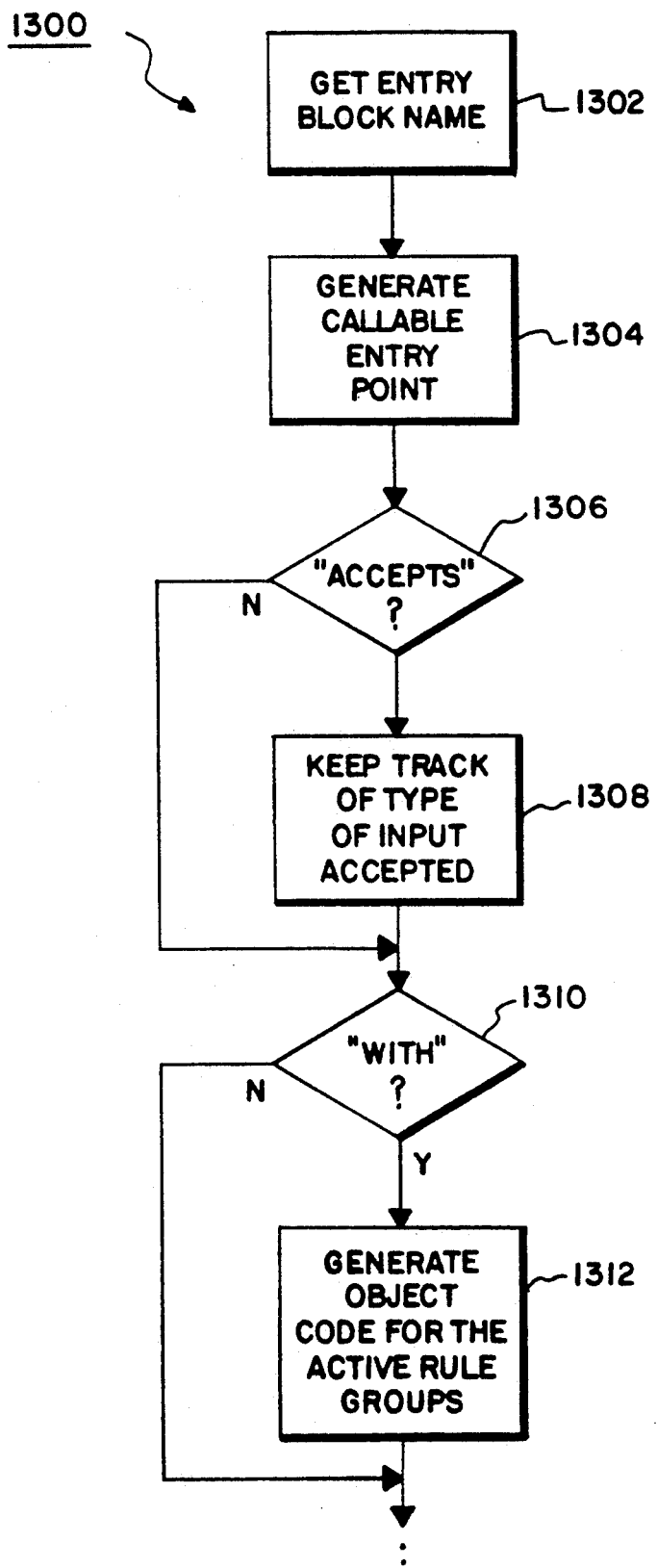
FIG. 13 is a flow chart showing the steps performed by a processor of a data processing system during compilation of an entry block declaration.

Now it will be described how compiler 404 transforms source code 1210 into object code 1250, with reference to FIGS. 12 and 13. FIG. 13 is a flow chart 1300 showing the steps performed by a processor of a data processing system executing compiler 404 while compiling entry block declarations. In step 1302 the processor fetches line 1212 from the source module and, in step 1340, the processor generates a callable entry point for the entry block. This callable entry point corresponds to pseudo object code 1252. In step 1306 the processor fetches line 1214 (if any) from the source module and, in step 1308, stores the types of external variables expected for entry block SCHEDULE-ORDER in a table (not shown). This table entry correspond to pseudo object code lines 1254, and may also be implemented as a hard-coded address or the like. In step 1310, the processor fetches line 1216 (if any) from the source module. Next, in step 1310, the processor generates executable code represented by pseudo object code 1256 as described below. Note that, as in FIG. 9, rules having duplicate names will not cause problems as long as only one of a plurality of conflicting rules is included in a given entry block by use of a "WITH" statement referencing its rule group.

Pseudo object code 1256 of FIG. 12 corresponds roughly to the steps of FIG. 8 discussed above. For each entry block declaration, compiler 404 generates initialization code 1258, which will not be described in detail, but which includes code to update the tables associated with the nodes of FIG. 7. Code 1258 corresponds to step 802 of FIG. 8. Similarly, lines 1260 of FIG. 12 correspond roughly to steps 804 through 808 of FIG. 8.

In FIG. 12, source code 1216 associates three rule groups A, B, and M with the module SCHEDULE-ORDER. In accordance with the present invention, the module could also be associated with any number of rule groups, depending on the contents of the "WITH" statement of FIG. 12.

Rule group B is "partitioned" for use by entry block SCHEDULE-ORDER only. In contrast, rule group A is shared among several entry blocks in the subsystem, and rule group M is shared among subsystems. The power and flexibility of rule modularity is that a programmer can partition and/or share rules between and among entry blocks and subsystems according to the knowledge of a human expert concerning when the rules are likely to be required.

FIG. 9 includes rule group A 920 and rule group Z 929. Both rule groups 920 and 929 include rules named A41 (reference numbers 960 and 962, respectively). Note, that at no point in either subsystem are both rules A41 known to the same entry block. Thus, when the declaration of entry block VALIDATE-ORDER is compiled, it will compile with rule A41 of first rule group A 920. In contrast, when entry block SHIP-ORDER is compiled, it will compile with the rules of rule group Z 929 (including rule A41). This similarity of rule names will not cause difficulties, as each rule A41 is private to one rule group 920 or 929.

Next, other statements that can be included in entry block declarations of a preferred embodiment of the invention will be discussed. These statements are preferably optional, and can be omitted from entry block declarations without harm. These additional statements are not shown in the FIG. 12 to simplify the example.

A first optional statement that can be included in an entry block declaration has the format:

PRECEDENCE precedence-list

This statement indicates a precedence of rules assigned to the entry block. The precedence list indicates a relative priority or importance of the rules assigned to the entry block. This statement can appear anywhere in the entry block declaration.

A second optional statement that can be included in an entry block declaration has the format:

STRATEGY strategy-name

This statement indicates a strategy used to decide which eligible rule associated with the entry block to fire in step 804 of FIG. 8. The statement can appear anywhere in the entry block declaration.

A third optional statement that can be included in an entry block declaration has the format:

ON-STARTUP start-up action(s)

This statement indicates to compiler 404 that the compiler should generate object code for one or more "start-up actions" at a location corresponding to point "A" of FIG. 12. Thus, the start-up actions will be performed after initialization for the entry block, i.e., after the rules have been tested, but before any rules have been fired. This statement can appear anywhere in the entry block declaration.

A fourth optional statement that can be included in an entry block declaration has the format:

ON-EMPTY rhs-action(s)

This statement indicates to compiler 404 that the compiler should generate object code for one or more "rhs actions" at a location corresponding to point "B" of FIG. 12. Thus, the rhs actions will be performed when the conflict set is empty, i.e., when no rules test TRUE. This statement can appear anywhere in the entry block declaration.

A fifth optional statement that can be included in an entry block declaration has the format:

ON-HALT rhs-action(s)

This statement indicates to compiler 404 that the compiler should generate object code for one or more "rhs actions" at a location corresponding to point "C" of FIG. 12. Thus, the rhs actions will be performed during loop 1260 if the loop is to be exited because of a HALT instruction in the RHS of a fired rule. This statement can appear anywhere in the entry block declaration.

A sixth optional statement that can be included in an entry has the format:

ON-EVERY-CYCLE rhs-action(s)

This statement indicates to compiler 404 that the compiler should generate object code for one or more "rhs actions" at a location corresponding to point "D" of FIG. 12. Thus, the rhs actions will be performed at some point within loop 1260, the exact point within loop 1260 being an implementation detail. This statement can appear anywhere in the entry block declaration.

In a preferred embodiment of the present invention, each WME class declaration, rule group declaration, and entry block declaration is ended implicitly, either when the compiler encounters another declaration or the end of a file, i.e., the end of a compilable module. Other embodiments may include explicit "END DECLARATION" statements or the like.

ii) Rule Modularity at Execution Time

With reference to the previous discussion, note that while steps 804 through 808 of FIG. 8, representing conventional rule-based systems, repeatedly test all rule groups in the system, pseudo object code lines 1261-1269 of the present invention only perform the recognize-act loop for those rules associated with the entry block by "WITH" statement 1216 because of the way the entry block declaration for SCHEDULE-ORDER was compiled.

Figure 14:
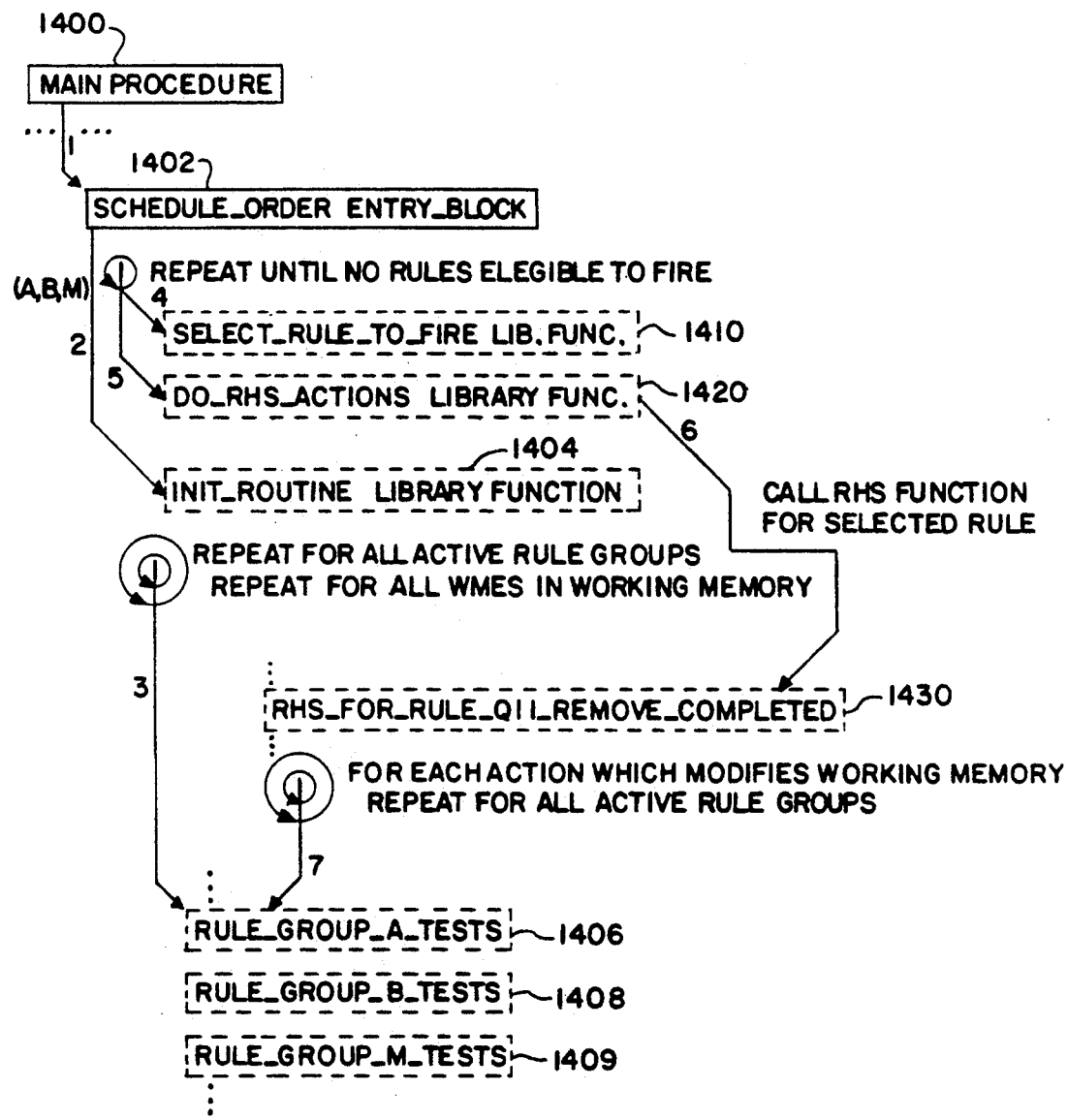
FIG. 14 shows an example of execution of a function MAIN that is written in a procedural language, such as Pascal or FORTRAN, and linked to modules written in rule-based programming language of the present invention.

FIG. 14 shows an example of execution of part of a function MAIN 1400 that is written in some procedural language, such as Pascal or FORTRAN. Function MAIN 1400 calls three rule-based entry blocks: VALIDATE-ORDER, SCHEDULE-ORDER, and SHIP-ORDER of FIG. 9, although only the code generated for entry block SCHEDULE-ORDER is shown. Entry blocks VALIDATE-ORDER, SCHEDULE-ORDER, and SHIP-ORDER and all modules called by them are generated from a rule-based programming language in the manner described above. FIG. 14 describes execution by processor 102 when control reaches the call to the SCHEDULE-ORDER entry block.

During execution, function MAIN 1400 passes data O of type order to the compiled code 1402 for SCHEDULE-ORDER entry block. SCHEDULE-ORDER entry Block 1402 calls INIT_ROUTINE 1404 and passes a list (A, B, M) of pointers identifying all rule groups active in SCHEDULE-ORDER entry block 1402. In FIG. 14, rule groups A, B, and M are active for SCHEDULE-ORDER entry block 1402.

For rule group A, and for each WME in working memory, INIT_ROUTINE 1404 passes control to RULE_GROUP_A_TESTS 1406. In RULE_GROUP_A_TESTS 1406 the tables associated with the trees for the LHS of each rule in Rule group A are updated and the conflict set for rule group A is updated.

Next, for rule group B and for each WME in working memory, INIT_ROUTINE 1404 passes control to RULE_GROUP_B_TESTS 1408. In RULE_GROUP_B_TESTS 1406 the tables associated with the trees for the LHS of each rule in Rule group B are updated and the conflict set for rule group B is updated.

Similarly, for rule group M and for each WME in working memory, INIT_ROUTINE 1404 passes control to RULE_GROUP_M_TESTS 1409. In RULE_GROUP_M_TESTS 1409, the tables associated with the trees for the LHS of each rule in Rule group M are updated and the conflict set for rule group M is updated.

Control then returns to INIT_ROUTINE 1404 and to SCHEDULE-ORDER 1402, where it passes to SELECT_RULE_TO_FIRE 1410. In SELECT_RULE_TO_FIRE 1410, a predetermined method of one of several known to persons of ordinary skill in the art is employed to choose one of the instantiations of the rules in the conflict sets of rule groups A, B, and M. The chosen instantiation preferably is removed from the conflict set to prevent its being rechosen at a later time.

Control then returns to SCHEDULE-ORDER 1402, where it passes to DO_RHS_ACTIONS 1420. The data passed to DO_RHS_ACTIONS 1420 includes the previously chosen instantiation from the conflict set.

DO_RHS_ACTIONS 1420 uses the rule number contained in the instantiation to access a pointer to the RHS (such as node 495 of FIG. 4) of the chosen rule 1430. In the example, when RHS code 1430 is executed, a WME is removed from working memory. Function 1430 also calls the rule group test 1406, 1408, or 1409 for the rule group to which the chosen rule belongs in order to update the tables for the LHS of the rule group and to update the conflict set.

Once the RHS code 1430 has executed, control returns to SELECT_RULE_TO_FIRE 1410 and DO_RHS_OF_RULE 1420 until no rules remain in the conflict sets of rules A, B, and M (see FIG. 8, step 804). When the conflict set is empty, the function performed by SCHEDULE-ORDER entry block 1402 is complete and control returns to MAIN 1400, where an entry block for FILL_ORDER (not shown) is called.

Figure 15:
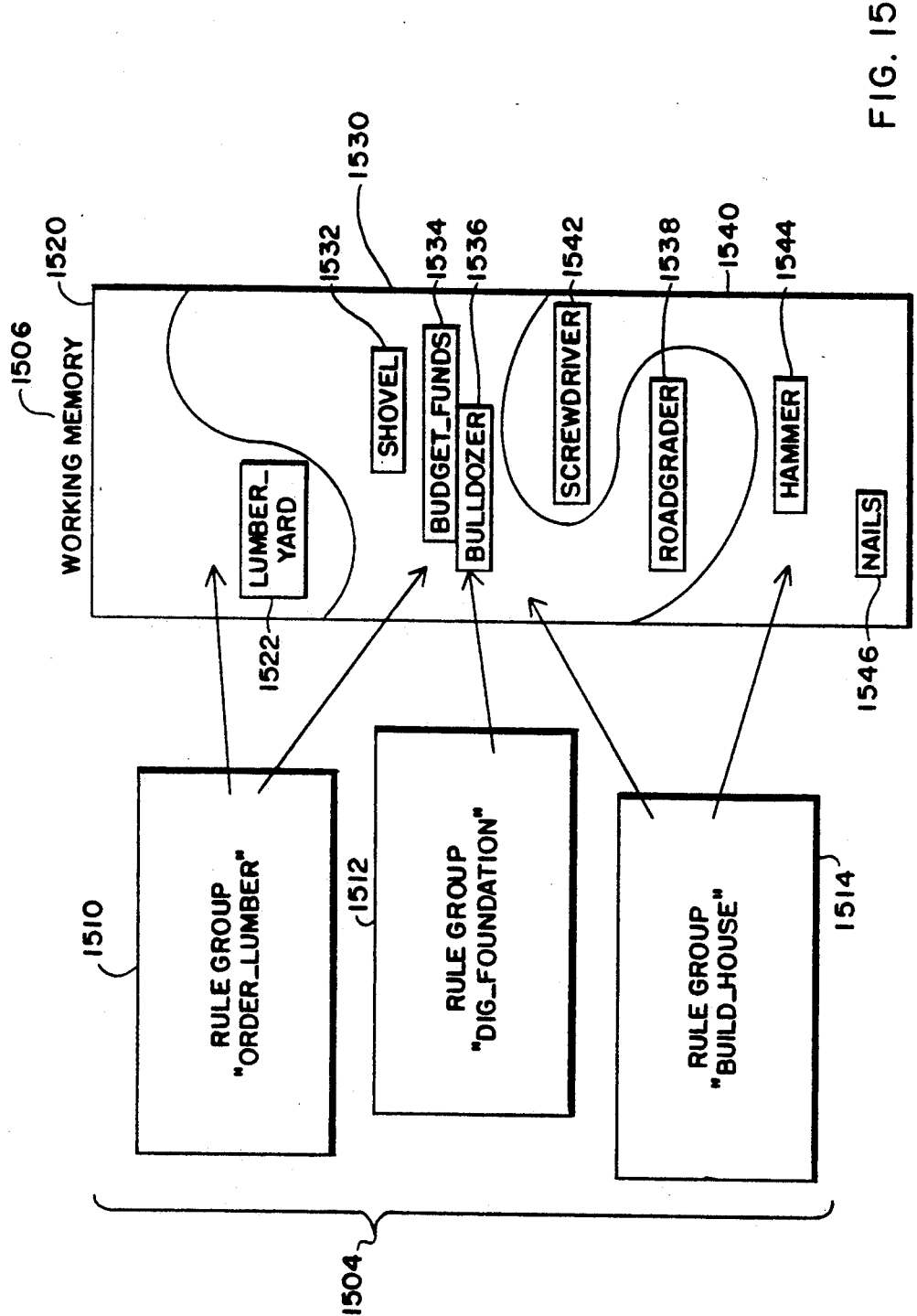
FIG. 15 shows an example of a second preferred embodiment of the present invention.

FIG. 15 shows an example of a second embodiment of the present invention. FIG. 15 includes a plurality of rule groups 1504 and a partitioned working memory 1506. Plurality of rule groups 1504 includes a first rule group ORDER-LUMBER 1510, a second rule group DIG-FOUNDATION 1512, and a third rule group BUILD-HOUSE 1514. Working memory 1506 in the example is partitioned into three partitions. A first partition 1520 includes a WME representing a LUMBERYARD 1522. A second partition 1530 includes WME's representing a SHOVEL 1532, BUDGET-FUNDS 1534, a BULLDOZER 1536, and a ROADGRADER 1538. A third partition 1540 includes a SCREWDRIVER WME 1542, a HAMMER WME 1544 and a NAILS WME 1546.

Note that rule group ORDER-LUMBER has access only to the WME's LUMBERYARD 1522, SHOVEL 1532, BUDGET-FUNDS 1534, BULLDOZER 1536, and ROADGRADER 1538; rule group DIG-FOUNDATION has access only to the WME's SHOVEL 1532, BUDGET-FUNDS 1534, BULLDOZER 1536, and ROADGRADER 1538; and rule group BUILD-HOUSE has access only to the WME's SHOVEL 1532, BUDGET-FUNDS 1534, BULLDOZER 1536, ROADGRADER 1538, SCREWDRIVER WME 1542, HAMMER 1544, and NAILS 1546.

In this embodiment, WME's are placed into a specific partition at run-time. For example, assume that a rule in rule group ORDER-LUMBER is executed and creates a LUMBER WME. Because the LUMBER WME must be accessed by rule group BUILD-HOUSE, the LUMBER WME must be placed into either partition 1530 or partition 1540. Rule group ORDER-LUMBER can access partition 1530 but not partition 1540 Thus, partition 1530 is the only partition that satisfies the accessibility requirements of both rule group ORDER-LUMBER 1510 and rule group BUILD-HOUSE 1514.

In a variation of the above-described preferred embodiment of the present invention, the requirement that a WME may only be created in a working memory partition accessible to the creating entry block is relaxed In this embodiment, a LUMBER WME could be created in partition 1540 by a rule in rule group ORDER-LUMBER, but once the LUMBER WME is created, rule group ORDER-LUMBER cannot access it. However, the LUMBER WME remains accessible to rule group BUILD-HOUSE.

In another variation of the above-described preferred embodiment, rule groups are given the ability to give themselves access to a partition of working memory during the execution of a rule, even if they were not given this access directly during the compilation of the rule group. In this embodiment, a rule in rule group ORDER-LUMBER 1510 could give itself accessibility to partition 1540, create a LUMBER WME in that partition, and then remove access to partition 1540.

Thus, the present invention incorporates into a compiled rule-based expert system the concepts of data modularity and rule modularity. The present invention allows a system to "share" data and rules among code modules and to "partition" data and rules so that only a certain subset of code modules has access to the data and rules. The ability to share and partition data and rules allows a computer programmer to separate the name spaces of separately compiled modules and reduces the complexity of a rule-based system so that the source code is easier to understand and modify.

In addition, the present invention can be embedded in a procedural program. Because execution of the expert system is entirely driven by code generated for the entry blocks, no specialized execution environment is required. This fact allows entry blocks to be accessed using a standard calling mechanism, thus simplifying integration with procedural languages and making it possible to easily embed the resulting expert system into traditional applications.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. A method for modularizing a set of rules used by an expert system, the expert system having a memory, the method comprising the steps of:
   organizing the set of rules into a plurality of disjoint rule groups;
   storing said plurality of disjoint rule groups in the memory;
   storing a plurality of entry blocks in the memory, each entry block defining a callable entry point to the set of rules;
   associating a predetermined entry block with at least one predetermined disjoint rule group;
   enabling, for said predetermined entry block; access to said at least one predetermined rule group; and disabling, for said predetermined entry block, access to any of said plurality of disjoint rule groups not associated with said predetermined entry block.

2. An expert system comprising:
a set of rules;
a memory;
means for organizing the set of rules into a plurality of disjoint rule groups;
means for storing said plurality of disjoint rule groups in the memory;
means for storing a plurality of entry blocks in the memory, each entry block defining a callable entry point to the set of rules;
means for associating a predetermined entry block with at least one predetermined disjoint rule group;
means for enabling, for said predetermined entry block; access to said at least one predetermined rule group; and
means for disabling, for said predetermined entry block, access to any of said plurality of disjoint rule groups not associated with said predetermined entry block.

* * * * *